United States Patent

Wise

[15] 3,653,383
[45] Apr. 4, 1972

[54] ALGIN SPONGE AND PROCESS THEREFOR

[72] Inventor: Raymond G. Wise, Evansville, Ind.
[73] Assignee: Freeze Dry Products Inc., Evansville, Ind.
[22] Filed: July 30, 1969
[21] Appl. No.: 846,276

[52] U.S. Cl.....................128/296, 260/209.6, 264/348
[51] Int. Cl. ...............................................A61f 13/00
[58] Field of Search..............128/155, 156, 284, 285, 287, 128/290, 296; 260/209.6; 264/28, 41, 237, 348

[56] References Cited

UNITED STATES PATENTS

| | | | |
|---|---|---|---|
| 2,610,625 | 9/1952 | Sifferd et al. | 128/296 |
| 3,122,479 | 2/1964 | Smith | 128/296 X |
| 3,157,178 | 11/1964 | Bentov | 128/296 X |

Primary Examiner—Charles F. Rosenbaum
Attorney—Burns, Doane, Swecker & Mathis

[57] ABSTRACT

Water-absorbent and water-disintegrative open-celled porous algin sponges are provided, which sponges may be used as medical receptors for biological fluids. The process for making the water-absorbent and water-disintegrative algin sponge includes freezing an algin dispersion, such as a gel of sodium alginate and calcium alginate, and thereafter sublimating the frozen dispersion medium.

7 Claims, No Drawings

1 …

ALGIN SPONGE AND PROCESS THEREFOR

BACKGROUND OF THE INVENTION

1. Field of the Invention

This invention relates to water-absorbent and water-disintegrative algin sponge products and to processes for making the same.

2. Description of the Prior Art

There has long been a need in fields such as medicine and dentistry for a highly absorbent sponge-like material that can absorb biological fluids at a controllable rate and then be entirely disposable by being dissolved or disintegrated in an excess of water. Various forms of cotton and other cellulose-type materials have been used in the past, but their absorption capacity is relatively limited and after use are almost necessarily disposed of by incineration, for flushing them down drains will tend to clog the drainage system.

U.S. Pat. No. 2,682,872 describes a hemostatic wound pad which is both water-absorbent and water-absorbable. The wound pad described therein, however, is limited by its construction material, human blood, and its other undesirable physical properties, i.e., the wound pad is relatively frangible and difficult to press into special shapes without crumbling or breaking. Further, the process described therein for making the wound pad involves rather complicated and delicate steps which do not easily lend themselves to commercial production.

U.S. Pat. No. 2,688,586 describes surgical gauze woven from calcium alginate fibers. The gauze, however, has about the same absorption capacity as other cellulosic-type gauze, and is insoluble in water.

SUMMARY OF THE INVENTION

Accordingly, an object of the present invention is to provide an improved water-absorbent and water-disintegrative shaped product.

Another object of the present invention is to provide an improved process for making water-absorbent and water-disintegrative shaped products.

Other objects will be apparent from the following.

In accordance with the present invention, a water-absorbent and water-disintegrative, i.e., capable of breaking up in an excess of water, sponge or sponge-like product is provided, which product is made of algin. Preferably, the algin is a sodium alginate-calcium alginate composition. The algin sponge can absorb water or aqueous solutions to a level many times its own weight. For example, the algin sponge may absorb water to a level up to 50 times its own weight, i.e., it may have an absorptive capacity of about 5,000 percent or even higher, while retaining structural integrity. Hydration beyond 100 percent of absorption capacity results in disintegration or dissolution of the algin sponge structure.

The algin sponge of the present invention can be used as medical receptors for biological fluids. Examples of such medical receptors include lacteal, fecal, catamenial, diaper, obstetric and surgical, sudatory, urethrorrheal and like receptors. The sponge products of the present invention may also be used in the treatments of burns and as dental or oral sponges.

In accordance with another aspect of the present invention, a process is provided for making the water-absorbent and water-disintegrative algin sponge, which process comprises freeze drying an algin dispersion, i.e., freezing an algin dispersion and thereafter sublimating the frozen dispersion medium, which process produces an open-celled porous algin sponge. Preferably, the algin dispersion is an aqueous gel of sodium alginate and calcium alginate.

In another aspect of the inventive process, the open-celled porous algin sponge is made more pliable by a rehydration step.

In a further aspect of the inventive process, the rehydrated algin sponge may be compressed to collapse at least a portion of the open-celled structure, which step can be used to control the rate of absorption of a fluid by the algin sponge.

Yet another aspect of the present inventive process includes further drying the compressed algin sponge to increase the absorptive capacity even more.

Other aspects and advantages of the present invention will become apparent from the following description of the preferred embodiments.

DESCRIPTION OF THE PREFERRED EMBODIMENTS

The algin product of the present invention may be made from water-dispersible algins. Algins are made from brown seaweed or kelps, chiefly from the giant kelp, *Macrocystis pyrifera*, on the Pacific coast, and from the horsetail kelp, *Laminaria digitata*, on the Atlantic coast. Algins are produced from the kelp by a series of steps including extraction, filtration, precipitation, numerous washings and reactions.

U.S. Pat. Nos. 1,778,688, 1,814,981, 1,814,986, 2,477,861 and others disclose the production of these algins. As algins are thus well known and widely available in finely divided form, their preparation need not be discussed further herein for sake of brevity.

Exemplary water-dispersible algins which may be suitable for use in the present invention are water-soluble alginates such as sodium alginate, potassium alginate, and ammonium alginate. Other water-soluble alginates include magnesium alginate, ethanolamine alginate, propanolamine alginate, butanolamine alginate, and algin acetate. The phospo-alginates and propylene glycol alginate may also be suitable. Mixtures or multiple salts of the above may also be suitable.

Preferably, water-dispersible algin compositions are used which are gel-forming. The formation of aqueous gels by means of alginates is well known. For example, methods for producing such gels are disclosed in U.S. Pat. Nos. 2,420,308, 3,349,079, and 3,386,921.

It is well known as aforesaid and as is shown in the aforementioned patents, which are incorporated herein by reference, that aqueous alginate gels or gel-forming compositions may be made using the above-listed water-soluble alginates with the addition of certain water-insoluble salts. The procedures for producing gel-forming compositions include admixing from 50 to 20 percent of a finely ground water-insoluble alginate such as calcium alginate with from 50 to 80 percent of a finely ground water-soluble alginate such as sodium alginate. Other water-insoluble alginates include the alginates of barium, copper, zinc, nickel, aluminum, tin, manganese, lead, iron, strontium, cadmium, mercury, and cobalt.

Other gel-forming alginate compositions include an alginate having 0.25 to 0.45 equivalent of calcium reacted per equivalent of alginic acid, the remaining 0.55 to 0.75 equivalent of said acid being substantially all reacted with a cation source that will produce a water-soluble salt when reacted with alginic acid. Such cation sources include sodium, potassium and ammonia.

Preferably, the gel-forming alginate compositions used in the present invention are calcium-sodium alginate compositions which may be prepared as described above.

Alginate dispersions or gels may be prepared by gradually adding the alginate compositions described above to hot or cold water with agitation. If desired, dispersion of the alginate composition may be facilitated by blending it with an amount, e.g., 100 to 500 percent, of another dry powder ingredient such as sugar or starch or by wetting it with an amount, e.g., 100 to 500 percent, of glycerin or alcohol prior to addition to the water.

The dispersion or gel of alginate may be formed by dispersing from 0.5 to 10 percent, preferably 0.5 to 5 percent, and most preferably from 1 to 2 percent by weight, of the alginate composition in water. Water temperature at time of dispersion may be from slightly above the freezing point to slightly below the boiling point of the water, preferably from about 10° to 30° C., and most preferably is room temperature, i.e., about 25° C.

The aqueous algin dispersion or gel is then freeze dried, i.e., the dispersion or gel is subjected to such conditions that the dispersion medium freezes and then sublimates.

For example, the aqueous algin dispersion or gel may be frozen at temperatures below about −2° C. Preferably, freezing is accomplished below −20° C., e.g., from −20° to −40° C., which can result in less friable final shaped alginate sponge product, believed due to the nature of the ice crystals formed at the lower temperatures.

After freezing, the frozen dispersion medium, i.e., ice, is sublimated from the frozen structure which results in the open-celled porous algin sponge product. Any temperature and pressure may be used which results in sublimation of the ice. Suitable conditions may be conveniently obtained from a phase diagram for water. See, for example, pages 456 through 458, of Barrow's *Physical Chemistry*, McGraw-Hill (1961). For example, vacuum conditions of below about 4 mm Hg, e.g., about 0.1 to 1 mm Hg, and preferably about 0.2 to 0.5 mm Hg, at chamber temperatures below 0° C., and preferably from −10° to −30° C., may be used. Sublimation should continue for a time sufficient to give the final algin sponge product an overall or average moisture content of less than 10 percent, preferably less than 5 percent, and most preferably less than 2 percent. The particular times, of course, vary with the particular conditions of sublimation, so as not to leave wet spots in the product. Such wet spots when air or oven dried may cause the final shaped product to distort or shrink, and become brittle and almost waterproof at wherever such wet spots existed.

After freeze drying, the resulting algin sponge normally has an open-celled porous structure. It may be described as a dehydrated dispersion or gel structure. The bulk density of the algin sponge may vary from about 0.01 to 1 g/cc, and normally is between 0.02 and 0.1 g/cc. The absorption capacity of the algin sponge product for water or aqueous solutions may be greater than 5,000 weight percent, i.e., the algin sponge product may absorb water or aqueous solutions in amounts greater than 50 times its own weight while retaining structural integrity. The absorption capacity may, in some cases, be as high as 9,000 weight percent. Of course, in some applications such an extremely high absorption capacity may not be necessary. In such applications, a lower absorption capacity, e.g., as low as 3,000 weight percent, may be suitable.

Hydration beyond 100 percent of absorption capacity results in disintegration of dissolution of the algin sponge for easy disposal.

The size of the open-cells or pores in the algin sponge is generally proportional to the concentration of alginate in the starting dispersion or gel.

The resulting open-celled porous algin sponge may then be rehydrated to a moisture content of between 5 and 90 percent, preferably between 10 and 50 percent, to make the sponge product more pliable and less brittle. Of course, the density of the rehydrated product is thereby increased proportionally.

Rehydration may be accomplished by treating the porous algin sponge product in a vacuum chamber with steam for about 5 to 30 seconds, and preferably from about 10 to 20 seconds, and at chamber pressures between about 1 mm Hg and 30 mm Hg, and preferably from about 10 to 20 mm Hg, preferably repeatedly at intervals of between 1 and 5 minutes, preferably 3 minutes, over a total time of about 5 to 60 minutes, and preferably for about 10 to 30 minutes and most preferably from about 15 to 20 minutes.

After rehydration, the rehydrated algin sponge can be compressed to collapse at least a portion of the open-celled structure, which results in a controlled rate of absorption. This rate for water at room temperature may vary from about 100 to 5,000, or more, and more normally about 300 to 3,000, weight percent, per minute. For example, the rehydrated algin sponge may be compressed between cooperating rollers or platens at temperatures from 5° to 200° C., and preferably from 120° to 150° C. In general, higher temperatures tend to increase density at a given applied pressure. The compressed product may have a density from above 0.01 to 1 g/cc, or higher.

After compression, the compressed algin sponge may be further dried to remove moisture in order to give the compressed product a greater absorption capacity. Preferably, the further drying is a freeze drying procedure as described above. The compressed algin sponge is preferably dried to a moisture content of less than 10 percent, preferably less than 5 percent, and most preferably about 1 percent or less. The density of the algin sponge at this point is decreased proportionally.

The present invention is further illustrated by the following examples. All parts and percentages in the examples and throughout the specification are by weight unless otherwise specified.

EXAMPLE I

A gel-forming alginate composition is prepared according to U.S. Pat. No. 3,349,079 by slurrying aqueous alginic acid at about 20 percent solids with isopropyl alcohol to give a mixture of equal parts of water and alcohol. The preparation of aqueous or wet alginic acid, per se, is well known to those skilled in the art and is disclosed, for example, in U.S. Pat. No. 1,814,981. To the prepared slurry is added the calcium carbonate in an amount that neutralizes 35 percent of the alginic acid, and the resulting admixture is agitated thoroughly for about 20 minutes. To the resulting mixture is added a sufficient quantity of sodium bicarbonate to neutralize, i.e., to give a neutral pH, the remaining 65 percent of the acid and agitation is continued for 20 minutes. Following the completion of the mixing of the aforementioned ingredients, the resulting fibrous product is pressed to remove alcohol and water. The product is then dried for 1½ hours at 50° C. in a tray drier. Thereafter the resulting dried product is milled to about 80 mesh in a Wiley mill.

A 2 percent gel is formed by quickly dispersing 2 parts of the above alginate composition in 100 parts of water at about 25° C. with high speed stirring at 7,000 rpm by a Waring-type blendor. The resulting highly viscous gel is then spread at a thickness of about 1 inch on a tray commonly used in freeze dry processes. The tray is placed in a blast freezer at about −35° C. for about 3 hours whereupon the gel freezes solid throughout. After freezing, the frozen gel is placed in the chamber of a conventional vacuum freeze dryer and dried for 20 hours at a chamber temperature of −25° C. and a pressure of 0.3 millimeters mercury. To assure uniformity of drying, the product is thus freeze dried to a moisture content of approximately 1 percent. The resulting open-celled porous algin sponge has a density of about 0.02 g/cc, and an absorptive capacity for water of greater than 5,000 percent.

EXAMPLE II

A portion of the freeze-dried algin product of Example I is uniformly hydrated to a level of moisture of approximately 10 percent. Hydration is effected by placing the freeze dried algin product in a vacuum chamber at 15 mm Hg and treating it with steam for 15 seconds at 3 minute intervals over a total time of 15 minutes. The resulting rehydrated algin sponge product is more pliable than the product of Example I, which is advantageous where the algin sponge must conform to a particular shape.

EXAMPLE III

The hydrated algin sponge product of Example II is compressed from a thickness of about 2.5 centimeters to a thickness of about 0.2 centimeters by using compression rollers heated at a temperature of 140° C., to alter the absorption rate of the algin sponge. The compressed algin sponge is then returned to the vacuum freeze dryer and again dried to about a 1 percent moisture content.

The final product has a density of 0.5 g/cc, and an absorptive capacity of greater than 5,000 percent.

EXAMPLE IV

To show the unique effects of freeze drying, a portion of the gel prepared in Example I is spread at a thickness of about 1 inch on a tray and placed in an oven dryer at about 120° C. and at atmospheric pressure for about 10 hours. The resulting oven-dried product has a moisture content of about 1 percent, but an absorptive capacity of only about one-fifth of the freeze dried algin sponge produced in Example I. Further, the oven-dried product has a dense amorphous structure not resembling the open-celled porous structure of the freeze dried product.

EXAMPLE V

About 2.4 grams, a sheet about 2.5 × 2.5 × 20 centimeters, of the resulting freeze dried algin sponge product of Example I, is placed in a beaker containing 175 ml. of water. In about 2 minutes, all of the water is absorbed by the sponge-like product which has swelled or expanded but still has structural integrity.

To show the altered rate of absorption of the compressed product of Example III, about 2.4 grams, a sheet about 2.5 × 10 × 0.2 centimeters, is placed in a beaker containing 175 ml. of water. In about 20 minutes all of the water is absorbed by the sponge-like product.

Thus, the absorption rate of the uncompressed product is 87.5 ml./min, while that of the compressed product is 8.75 ml./min.

EXAMPLE VI

A third degree burn of human skin tissue results in emission of fluid from the burned surface area during the early healing period. A medical dressing comprising a portion of the algin sponge of Example I is placed directly on the burned surface, and absorbs the seepage but does not adhere to the tender new tissue upon removal of the dressing. After use, the sponge dressing is disposed of by disintegrating it in an excess of water and flushing down a drain.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

I claim:

1. An open-celled, porous algin sponge comprising at least one water-soluble alginate and at least one water-insoluble alginate, said algin sponge further being water-absorbent, said algin sponge further being water-disintegrative.

2. The algin open-celled, porous sponge of claim 1 in the form of a medical receptor for biological fluids.

3. The algin open-celled, porous sponge of claim 2 having an absorptive capacity of greater than 5,000 percent.

4. An algin sponge comprising at least one water-soluble alginate and at least one water-insoluble alginate,
    said algin sponge having an open-celled structure,
    said algin sponge being water-absorptive,
    said algin sponge being water-disintegrative,
    said algin sponge having a moisture content of less than 90 percent, and
    said algin sponge further having a density between about 0.01 and 1 g/cc.

5. The algin open-celled porous sponge of claim 4 in the form of a medical receptor for biological fluids.

6. An algin sponge,
    said algin sponge consisting essentially of calcium alginate and sodium alginate,
    said algin sponge having an open-celled porous dehydrated gel structure,
    said algin sponge having a density between about 0.01 and 0.1 g/cc,
    said algin sponge having a moisture content of less than 5 percent,
    said algin sponge having an absorptive capacity for water of greater than 5,000 percent, and
    said algin sponge being water-disintegrative.

7. The open-celled, porous sponge of claim 4 in which the water-soluble alginate is sodium alginate and the water-insoluble alginate is calcium alginate.

* * * * *